United States Patent
Araki

(10) Patent No.: US 9,977,635 B2
(45) Date of Patent: May 22, 2018

(54) ELECTRONIC DEVICE INCLUDING JAVA PLATFORM AND JAVA APPLICATION AND BEING CAPABLE OF RECEIVING BOTH PANEL LOGIN AND BACKGROUND LOGIN AND ELECTRONIC DEVICE SYSTEM PROVIDED WITH SAME

(71) Applicant: KYOCERA Document Solutions Inc., Osaka (JP)

(72) Inventor: Takashi Araki, Osaka (JP)

(73) Assignee: KYOCERA Document Solutions Inc., Tamatsukuri, Chuo-ku, Osaka (JP)

(*) Notice: Subject to any disclaimer, the term of this patent is extended or adjusted under 35 U.S.C. 154(b) by 42 days.

(21) Appl. No.: 15/190,138

(22) Filed: Jun. 22, 2016

(65) Prior Publication Data
US 2016/0380995 A1 Dec. 29, 2016

(30) Foreign Application Priority Data
Jun. 25, 2015 (JP) ................. 2015-127540

(51) Int. Cl.
*G06F 3/12* (2006.01)
*G06F 21/60* (2013.01)
*G06F 21/31* (2013.01)
*H04L 29/06* (2006.01)
(Continued)

(52) U.S. Cl.
CPC .......... *G06F 3/1238* (2013.01); *G06F 3/1222* (2013.01); *G06F 21/31* (2013.01); *G06F 21/608* (2013.01); *H04L 63/083* (2013.01); *H04N 1/00204* (2013.01); *H04N 1/4406* (2013.01);
(Continued)

(58) Field of Classification Search
CPC .... G06F 3/1238; G06F 3/1222; G06F 21/608; G06F 21/31; H04N 1/4406; H04N 1/4413; H04N 1/00204; H04N 2201/0039; H04N 2201/0094; H04L 63/083

See application file for complete search history.

(56) References Cited

U.S. PATENT DOCUMENTS 7,327,478 B2 2/2008 Matsuda
8,645,961 B2 2/2014 Yoshimura et al.
(Continued)

FOREIGN PATENT DOCUMENTS

JP 2002359718 A 12/2002
JP 2008-271185 A 11/2008

*Primary Examiner* — Theodore C Parsons
(74) *Attorney, Agent, or Firm* — IP Business Solutions, LLC

(57) ABSTRACT

An electronic device includes an operating device, a communication device, and a control section. The control section includes a login control section and an operation executing section. The login control section is capable of receiving both of a login through the operating device and a login through the communication device. The operation executing section: executes only an operation corresponding to a request received through the operating device when the login through the operating device is successful; and executes only an operation corresponding to a request received through the communication device when the login through the communication device is successful. The electric device may comprise a multi-function printer or image forming apparatus, and the operating device may comprise a control panel, in some embodiments.

4 Claims, 8 Drawing Sheets

(51) Int. Cl.
*H04N 1/44* (2006.01)
*H04N 1/00* (2006.01)
(52) U.S. Cl.
CPC ... *H04N 1/4413* (2013.01); *H04N 2201/0039* (2013.01); *H04N 2201/0094* (2013.01)

(56) References Cited

U.S. PATENT DOCUMENTS

| | | | |
|---|---|---|---|
| 2002/0122203 A1* | 9/2002 | Matsuda | H04N 1/00204 358/1.15 |
| 2008/0263546 A1 | 10/2008 | Yoshimura et al. | |
| 2010/0231950 A1* | 9/2010 | Sawayanagi | G06F 3/1204 358/1.14 |
| 2011/0122439 A1* | 5/2011 | Sato | G06F 21/608 358/1.15 |
| 2013/0222840 A1* | 8/2013 | Hosoda | H04N 1/00204 358/1.14 |

* cited by examiner

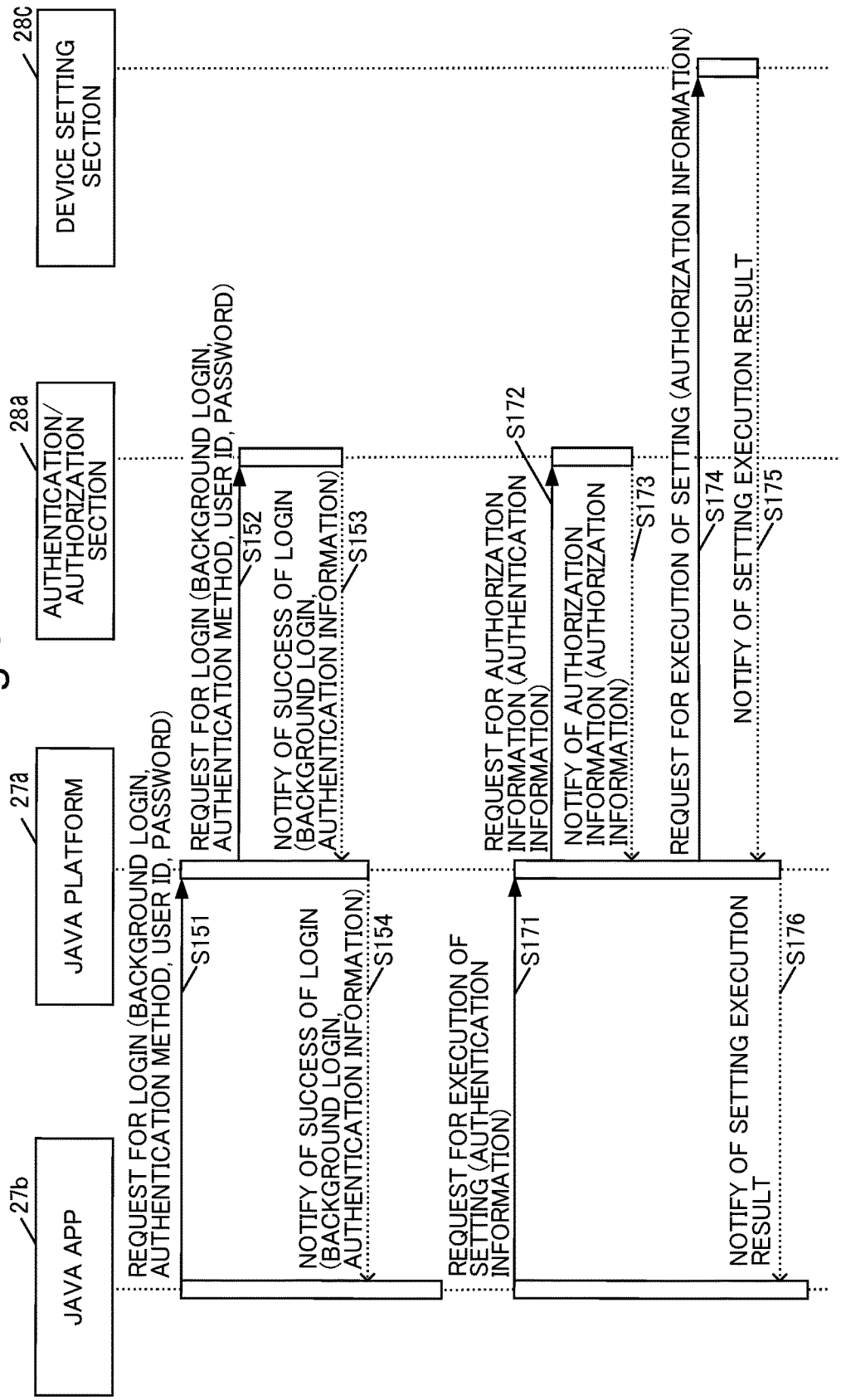

ELECTRONIC DEVICE INCLUDING JAVA PLATFORM AND JAVA APPLICATION AND BEING CAPABLE OF RECEIVING BOTH PANEL LOGIN AND BACKGROUND LOGIN AND ELECTRONIC DEVICE SYSTEM PROVIDED WITH SAME

INCORPORATION BY REFERENCE

This application claims priority to Japanese Patent Application No. 2015-127540 filed on Jun. 25, 2015, the entire contents of which are incorporated by reference herein.

BACKGROUND

The present disclosure relates to an electronic device which executes an operation corresponding to a request from a remote location, an electronic device system, and a non-transitory recording medium.

As an electronic device which executes an operation corresponding to a request from a remote location, a typical image forming apparatus that includes an operating device into which an operation instruction is inputted and a communication device which communicates, and that executes a printing according to a request received through the communication device is known.

SUMMARY

According to an aspect of the present disclosure, an electronic device includes an operating device, a communication device, and a control section.

An operation instruction is inputted to the operating device.

A communication device communicates.

The control section includes a login control section and an operation executing section.

The login control section controls a login.

The operation executing section executes an operation corresponding to a request when the login controlled by the login control section is successful.

The login control section receives both of a login through the operating device and a login through the communication device.

The operation executing section executes: an operation corresponding to a request only through the operating device out of the operating device and the communication device when the login through the operating device is successful; and an operation corresponding to a request only through the communication device out of the operating device and the communication device when the login through the communication device is successful.

According to an another aspect of the present disclosure, a non-transitory computer-readable recording medium including an operation control program causes the control section in the electronic device which includes the operating device, the communication device, and the control section, to function as the login control section and the operation executing section.

BRIEF DESCRIPTION OF THE DRAWINGS

FIG. 8 is a sequence diagram of the operation of the MFP of FIG. 2 in performing the background login and an execution of a setting.

DETAILED DESCRIPTION

Hereinafter, a description will be given of an embodiment of the present disclosure with reference to the drawings.

A description will be given of a configuration of an image forming system as an electronic device system according to this embodiment.

Figure 1:
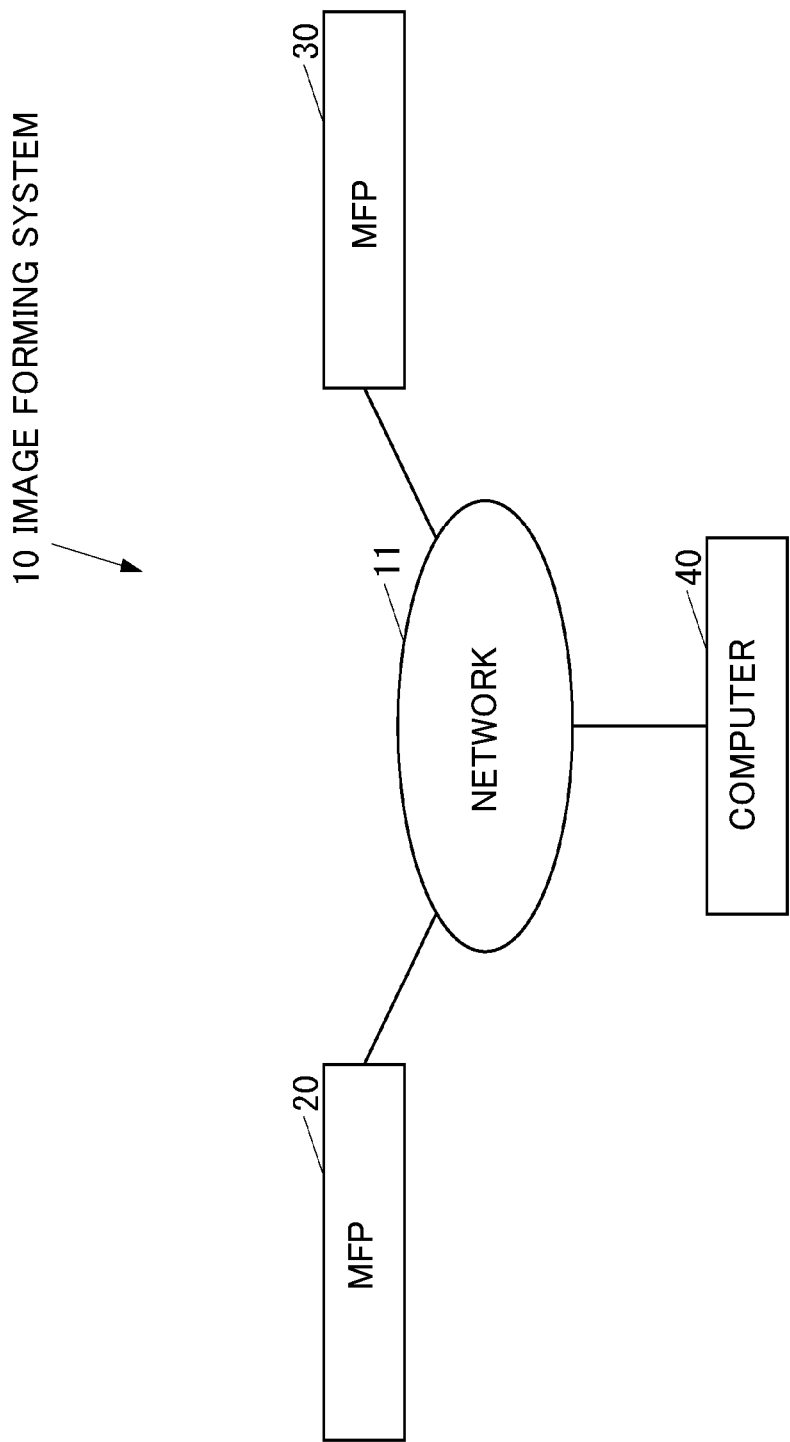
FIG. 1 is a schematic diagram illustrating a configuration of an image forming system according to an embodiment of the present disclosure.

FIG. 1 is a schematic diagram illustrating the configuration of the image forming system 10 according to this embodiment.

As illustrated in FIG. 1, the image forming system 10 includes an MFP (multifunction peripheral) 20 and an MFP 30 each serving as an electronic device, and a computer 40, such as a PC (personal computer). The MFP 20, the MFP 30, and the computer 40 are communicably connected via a network 11, such as a LAN (local area network) or the Internet.

Figure 2:
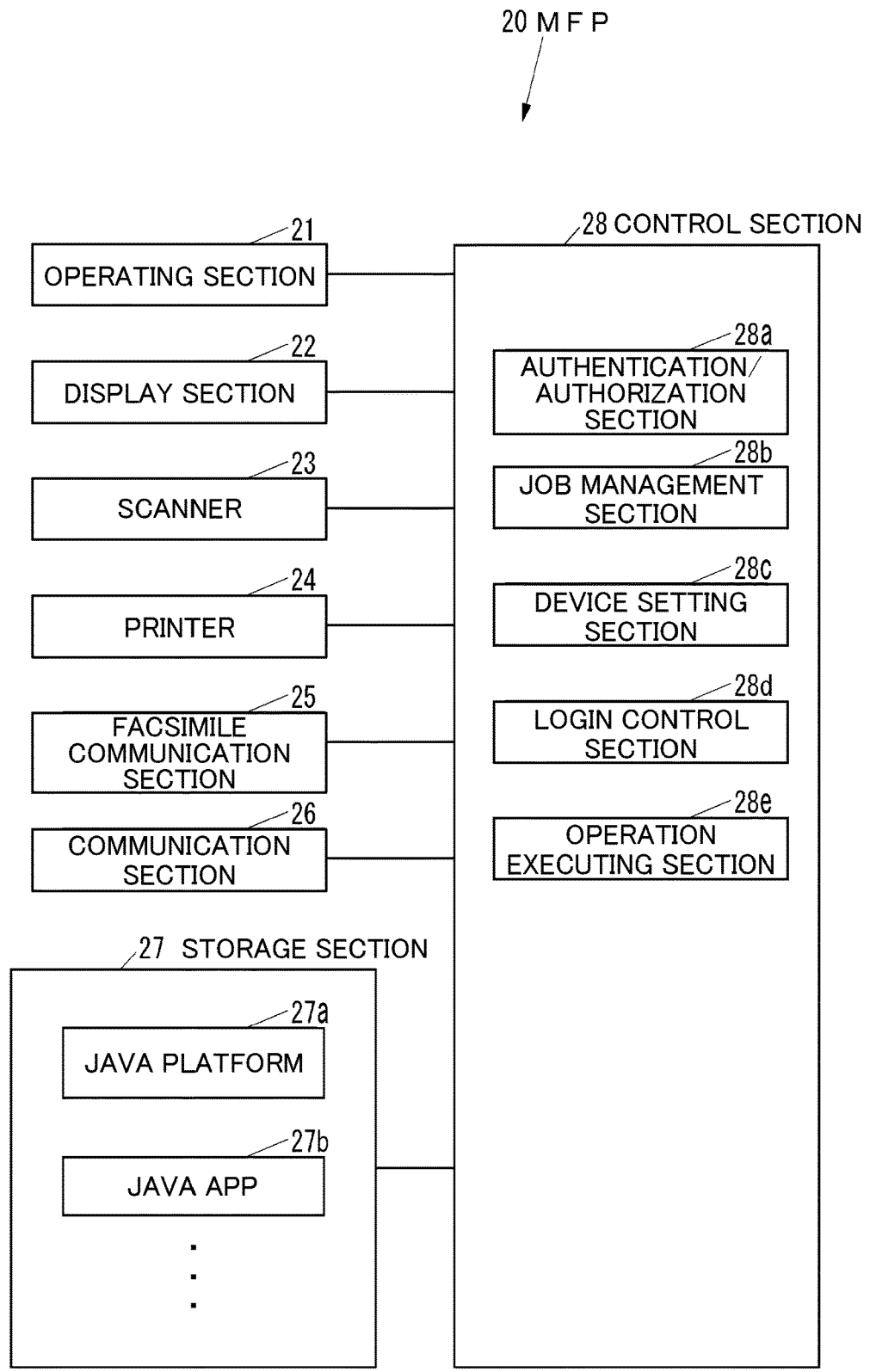
FIG. 2 is a schematic diagram illustrating a block configuration of an MFP in FIG. 1.

FIG. 2 is a schematic diagram illustrating a block configuration of the MFP 20.

As illustrated in FIG. 2, the MFP 20 includes: an operating section 21 which is an operating device, including buttons, through which various operation instructions are inputted by a user; a display section 22 which is a display device, such as an LCD (liquid crystal display), capable of displaying various types of information; a scanner 23 which is a scanning device configured to scan image data from an original document; a printer 24 which is a printing device configured to perform printing on a recording medium, such as a paper sheet; a facsimile communication section 25 which is a facsimile device configured to communicate by facsimile via a communication line, such as a public phone line, with not-illustrated external facsimile devices; a communication section 26 which is a communication device capable of communicating via the network 11 (see FIG. 1) with external devices, such as the MFP 30 (see FIG. 1) and the computer 40 (see FIG. 1); a storage section 27 which is a storage device, such as a semiconductor memory or an HDD (hard disk drive), including various types of data; and a control section 28 which is configured to control the whole of the MFP 20.

The storage section 27 may include a Java (registered trademark) platform 27a. The storage section 27 may be any storage devices including data, for example, an EEPROM (electrically erasable programmable read only memory), an HDD, a semiconductor memory, or a ROM (read only memory). The storage section 27 may include a plurality of Java applications 27b, each of which serves as an operation control program that operates on the Java platform 27a. The MFP 20 may install the Java platform 27a and the Java application 27b during the production stage. The MFP 20 may also additionally install the Java platform 27a and the Java application 27b from a recording medium, such as an SD (secure digital) card, or a USB (universal serial bus) memory, i.e., a non-transitory computer-readable recording medium, or from the network 11.

The Java platform 27a is the program controlling a life cycle of the Java application 27b, for example, an installment of the Java application 27b, activation, a cancellation on the activation, or uninstallation.

The Java application 27b is the program to enhance functions of MFP 20 by utilizing functions of MFP 20 and by linking the MFP 20 to other electronic devices, such as the MFP 30 or the computer 40. The functions of the MFP 20 to be enhanced include: the scan function scanning image data with the scanner 23 from an original document; a copy function executing print on the recording medium with the printer 24 based on the image data scanned by the scanner 23from the original document; and a sending function sending data, such as image data, via the facsimile communication section 25or the communication section 26.

The control section 28 includes, for example, a processor, a ROM including a program and various types of data, and a RAM (random access memory) to be used as a workspace for a CPU (central processing unit). The processor is, for example, a CPU, an ASIC (application specific integrated circuit), or an MPU (micro processing unit). The processor executes programs included in the ROM or the storage section 27.

By executing the program included in the ROM or in the storage section 27, the control section 28 functions as: an authentication/authorization section 28a that executes an authentication and/or authorization of a user; a job management section 28b that controls an execution of a job of the MFP 20; and a device setting section 28c that controls to refer an information of the MFP 20 and to execute a setting of the MFP 20.

By executing the Java application 27b included in the storage section 27, the control section 28 functions as: a login control section 28d that controls the login by the user; and an operation executing section 28e that executes an operation corresponding to a request when the login controlled by the login control section 28d is successful.

Here exist two types of login methods: a panel login, which is a login through the operating section 21; and a background login, which is a login through the communication section 26. The operating section 21 is simultaneously available to only one user, so that in the panel login through the operating section 21, the login condition is only allowed to one user simultaneously. In contrast, the communication section 26 is simultaneously available to plural users, so that in the background login through the communication section 26, the login condition is allowed to plural users simultaneously.

There are three types of authentication methods: a local authentication, a network authentication, and an extensible authentication. In the local authentication, a combination of a user ID and a password, which serves as an identification information of the user, is included in the storage section 27. In the network authentication, the combination of the user ID and the password exists not at the MFP 20 but at an electronic device on the network 11. In the extensible authentication, the combination of the user ID and the password exists at each of the Java applications 27b.

The MFP 30 (see FIG. 1) has the same configuration as the MFP 20 and further explanation thereof will be omitted.

The computer 40 (see FIG. 1) has the same configuration as a typical PC and further explanation thereof will be omitted.

An operation of the image forming system 10 will now be explained.

An operation of the MFP 20 in performing the panel login and the execution of the job will now be explained.

Figure 3:
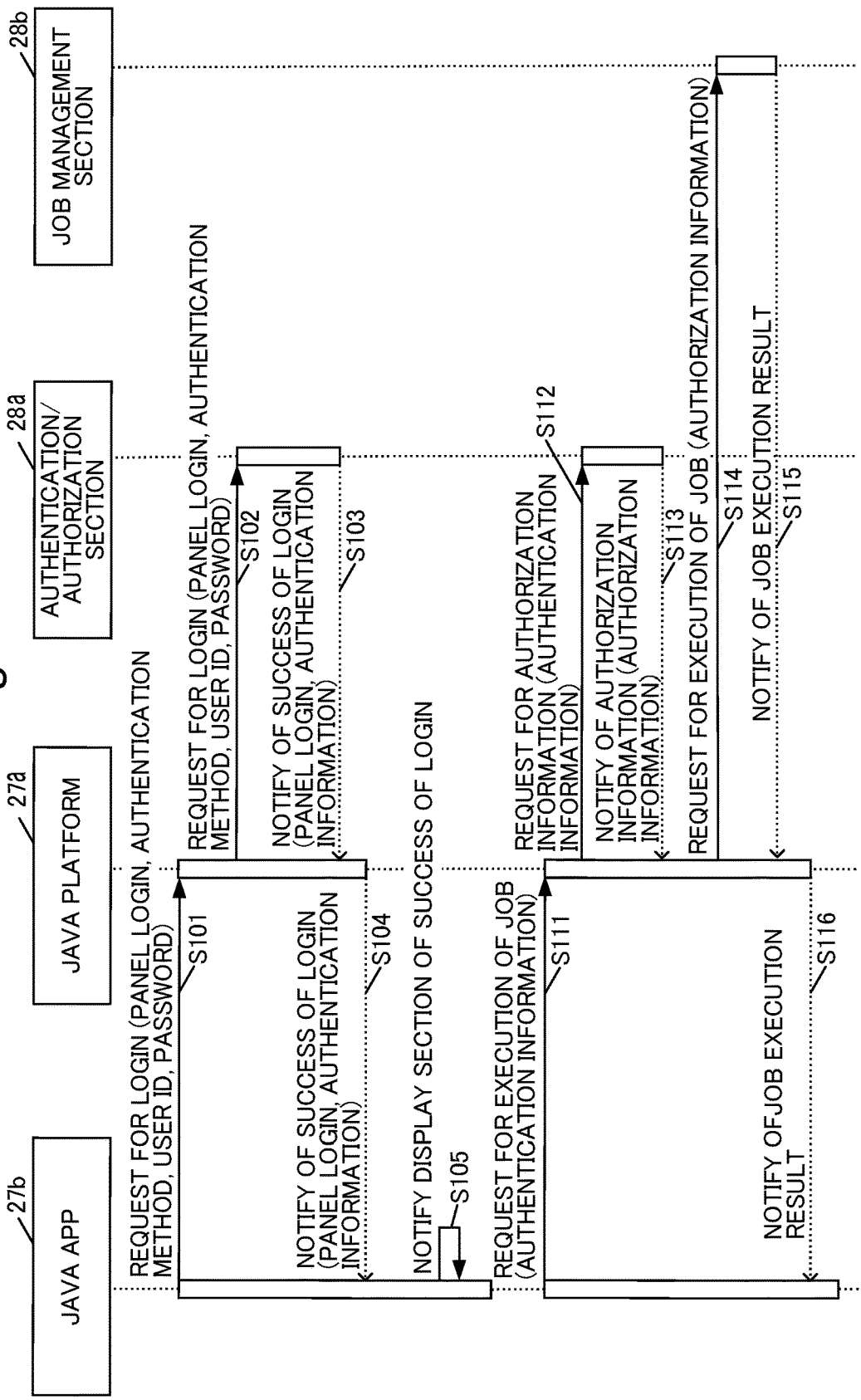
FIG. 3 is a sequence diagram of an operation of the MFP of FIG. 2 in performing a panel login and an execution of a job.

FIG. 3 is a sequence diagram of the operation of the MFP 20 in performing the panel login and the execution of the job.

When a user instructs the MFP 20 through the operating section 21 to execute the panel login, as illustrated in FIG. 3, the login control section 28d on the Java application 27b receives the panel login instructed by the user, and requests the login to the Java platform 27a (S101). In the request in S101, the login control section 28d includes that the method of the login is the panel login. The request in S101 also includes: the authentication method of the panel login; and the user ID and the password, which were inputted through the operating section 21. The authentication method of the panel login is previously set among aforesaid three types of the methods.

When the login is requested from the login control section 28d in S101, the Java platform 27a requests the login to the authentication/authorization section 28a (S102). In the request in S102, the Java platform 27a includes the login method, the authentication method, the user ID, and the password, all of which were notified from the login control section 28d in S101.

When the login is requested from the Java platform 27a in S102, the authentication/authorization section 28a executes the authentication with the authentication method that the Java platform 27a notified in S102 and using the user ID and the password that the Java platform 27a notified. Then, if the authentication is successful, that is, if the login is successful, the authentication/authorization section 28a notifies the success of the login to the Java platform 27a (S103). In the notification in S103, the authentication/authorization section 28a includes the login method notified in S102 from the Java platform 27a, and the authentication information indicating the success in the authentication of the user who is on the user ID notified in S102 from the Java platform 27a.

When the success of the login is notified in S103 from the authentication/authorization section 28a, the Java platform 27a notifies the success of the login to the login control section 28d on the Java application 27b (S104). In the notification in S104, the Java platform 27a includes the login method and the authentication information notified from the authentication/authorization section 28a in S103.

When the success of the login is notified in S104 from the Java platform 27a, namely, the panel login is successful, so that the login control section 28d notifies the success of the login to the display section 22 (S105).

Figure 4:
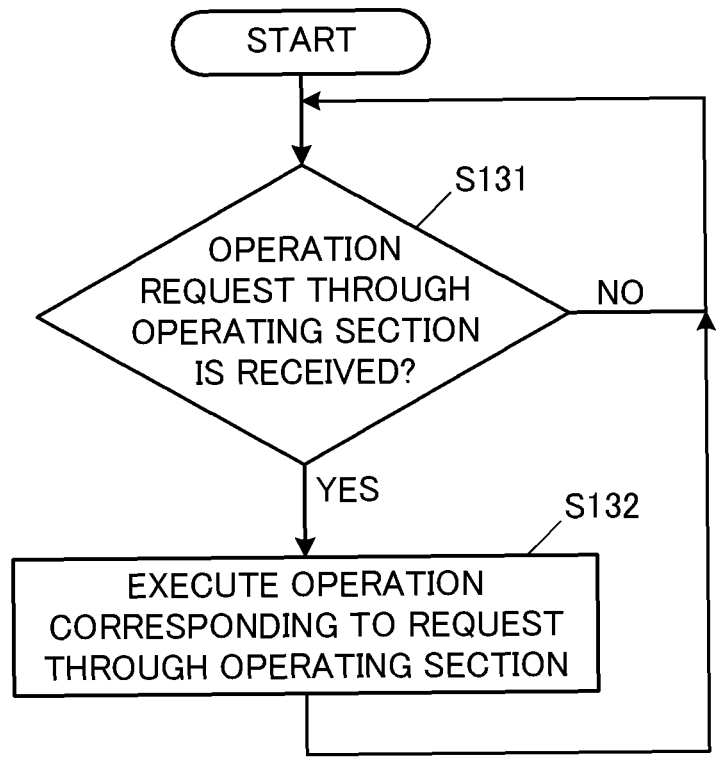
FIG. 4 is a flowchart of the operation of the MFP of FIG. 2 in a success of the panel login.

FIG. 4 is a flowchart of the operation of the MFP 20 in the success of the panel login.

When the success of the login is notified in S104 to the login control section 28d, the operation executing section 28e on the Java application 27b executes the operation illustrated in FIG. 4.

As illustrated in FIG. 4, until the operation request through the operating section 21 is determined to be received, the operation executing section 28e continues a process of determining whether said operation request is received or not (S131).

When the operation request through the operating section 21 is determined to be received in S131, the operation executing section 28e executes the operation corresponding to the request through the operating section 21 (S132) and executes the operation in S131.

Namely, when the panel login, that is, the login through the operating section 21, is successful, the operation executing section 28e executes the operation corresponding to the request through the operating section 21, but does not execute the operation corresponding to the request through the communication section 26.

As illustrated in FIG. 3, the operation executing section 28e, therefore, requests the Java platform 27a to execute the requested job when the execution of a specific job is requested through the operating section 21 after the process in S105 (S111). In the request in S111, the operation executing section 28e includes the authentication information notified to the login control section 28d from the Java platform 27a in S104.

When the execution of the job is requested from the operation executing section 28e in S111, the Java platform 27a requests the authorization information corresponding to the authentication information notified from the operation executing section 28e in S111 to the authentication/authorization section 28a (S112). In the request in S112, the Java platform 27a includes the authentication information notified from the operation executing section 28e in S111.

When the authorization information is requested in S112 from the Java platform 27a, the authentication/authorization section 28a acquires the authorization information corresponding to the user ID included in the authentication information notified from the Java platform 27a in S112 from the storage section 27 or from a not-illustrated server on the network 11. The authentication/authorization section 28a then notifies the Java platform 27a of the acquired authorization information (S113).

When the authorization information is notified from the authentication/authorization section 28a in S113, the Java platform 27a requests the job management section 28b to execute the job requested in S111 from the operation executing section 28e (S114). In the request in S114, the Java platform 27a includes the authorization information notified in S113 from the authentication/authorization section 28a.

When the execution of the job is requested from the Java platform 27a in S114, the job management section 28b executes the job that the Java platform 27a has requested to execute in S114, in a case where the requested job is executable based on the authorization information notified from the Java platform 27a in S114. The job management section 28b notifies the Java platform 27a of the execution of the job result (S115).

When the execution of the job result is notified from the job management section 28b in S115, the Java platform 27a notifies the operation executing section 28e on the Java application 27b of the execution of the job result (S116). Accordingly, the operation executing section 28e may notify, for example, the execution result notified from the Java platform 27a to the display section 22 in S116.

Although the execution of the job is illustrated in FIG. 3, the same applies to other job operations besides the execution of the job, such as a job cancellation.

Also, although FIG. 3 illustrates the case where one job is operated per one successful login, a plurality of jobs may be executed per one successful login.

The operation of the MFP 20 in performing the panel login and the execution of the setting will now be explained.

Figure 5:
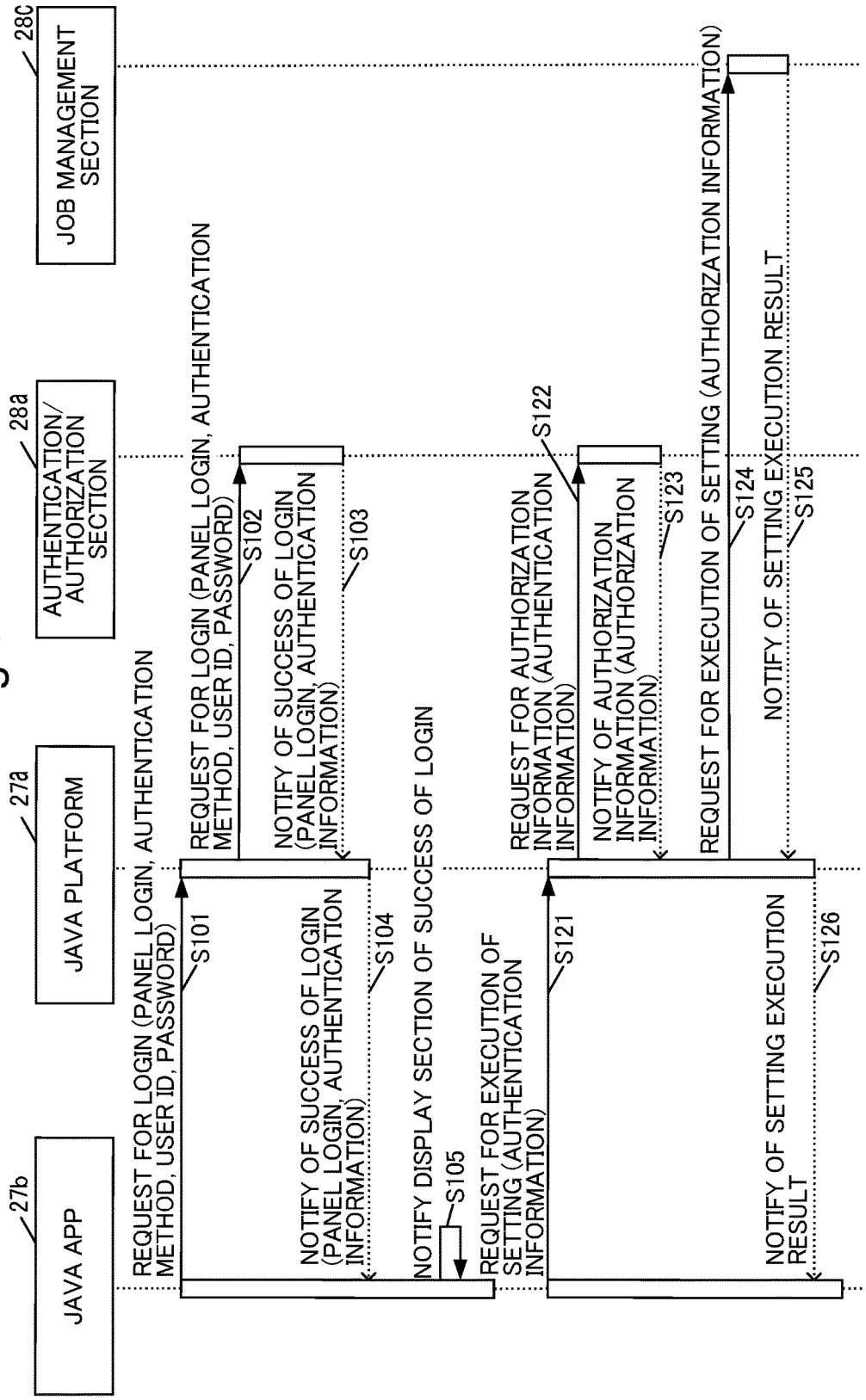
FIG. 5 is a sequence diagram of the operation of the MFP of FIG. 2 in performing the panel login and an execution of a setting.

FIG. 5 is a sequence diagram of the operation of the MFP 20 in performing the panel login and the execution of the setting.

As illustrated in FIG. 5, the MFP 20 executes the processes in S101 to S105 which are the same operations illustrated in FIG. 3.

Then, as illustrated in FIG. 5, when the execution of a specific setting of the MFP 20 is requested through the operating section 21 after the process in S105, the operation executing section 28e requests the Java platform 27a to execute the requested setting (S121). In the request in S121, the operation executing section 28e includes the authentication information notified to the login control section 28d from the Java platform 27a in S104.

When the operation executing section 28e requests the Java platform 27a in S121 to execute the setting, the MFP 20 executes operations in S122 and S123 which are the same operations illustrated in S112 and S113 in FIG. 3.

When the authorization information is notified from the authentication/authorization section 28a in S123, the Java platform 27a requests the device setting section 28c to execute the setting requested in S121 from the operation executing section 28e (S124). In the request in S124, the Java platform 27a includes the authorization information notified from the authentication/authorization section 28a in S123.

When the execution of the setting is requested from the Java platform 27a in S124, the device setting section 28c executes the setting that the Java platform 27a has requested in S124, in a case where the requested setting is executable based on the authorization information notified from the Java platform 27a in S124. The device setting section 28c notifies the Java platform 27a of the setting execution result (S125).

When the setting execution result is notified from the device setting section 28c in S125, the Java platform 27a notifies the operation executing section 28e on the Java application 27b of the notified execution result (S126). Accordingly, the operation executing section 28e may notify, for example, the execution result notified from the Java platform 27a to the display section 22 of in S126.

Although the execution of the setting is illustrated in FIG. 5, the same applies to other setting operations besides the execution, such as a reference to the setting.

Also, although FIG. 5 illustrates the case where one setting is executed per one successful login, the setting may be executed a plurality of times per one successful login.

Additionally, although FIG. 3 illustrates the execution of the job as a result of the success of the login and FIG. 5 illustrates the execution of the setting as a result of the success of the login, the job and the setting may be both executed on one successful login.

Furthermore, FIG. 3 and FIG. 5 illustrate that the notification on the successful login displayed at the display section 22 is executed by the login control section 28d on the Java application 27b. However, the notification on the successful login displayed at the display section 22 may be executed by either of the Java platform 27a or the authentication/authorization section 28a.

The operation of the MFP 20 in performing the background login and the execution of the job will now be explained.

Figure 6:
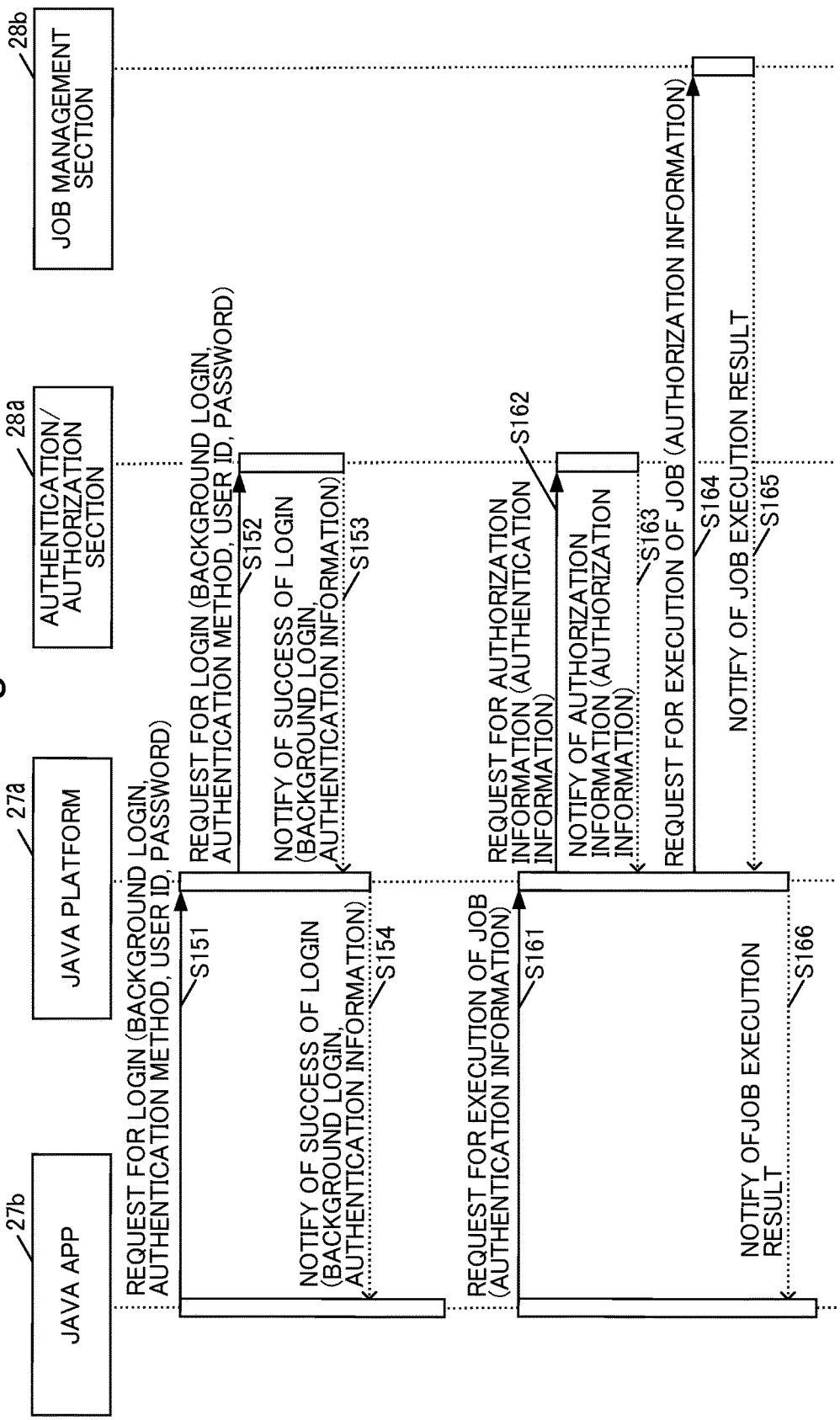
FIG. 6 is a sequence diagram of the operation of the MFP of FIG. 2 in performing a background login and an execution of a job.

FIG. 6 is a sequence diagram of the operation of the MFP 20 in performing the background login and the execution of the job.

When the execution of the background login is instructed through the communication section 26 from the electronic device, such as the MFP 30 or the computer 40, the MFP 20 executes the operations in S151 to S154, which are similar operations in S101 to S104 illustrated in FIG. 3. The operations in S151 to S154 are like the operations in S101 to S104, except that the login method included in the request or the notification is the background login, not the panel login, and the authorization method included in the request or the notification is the authentication method of the background login, not the authentication method of the panel login. The authentication method of the background login is previously set among aforesaid three types of the methods.

Unlike the success in the panel login, even when the success of the login is notified from the Java platform 27a in the S154, the login control section 28d does not notify the success of the login to the display section 22. The login control section 28d may, however, notify the success of the login through the communication section 26 to the electronic device that has instructed the execution of the background login through the communication section 26.

As indicated in S152 and S153, the Java platform 27a discloses, to Java application 27b, an interface in which the authentication/authorization section 28a as one of the functions of the MFP 20 is to be used in the background.

Figure 7:
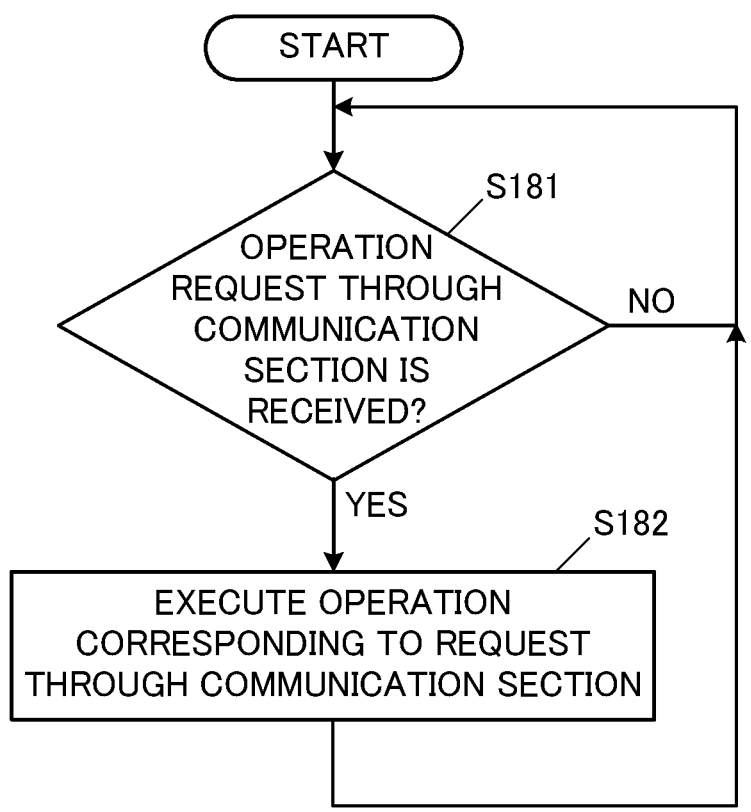
FIG. 7 is a flowchart of the operation of the MFP of FIG. 2 in a success of the background login.

FIG. 7 is a flowchart of the operation of the MFP 20 in the success of the background login.

When the success of the login is notified to the login control section 28d in S154, the operation executing section 28e on the Java application 27b executes the operation illustrated in FIG. 7.

As illustrated in FIG. 7, until the operation request through the communication section 26 is determined to be received, the operation executing section 28e continues a process of determining whether said operation request is received or not (S181).

When the operation request through the communication section 26 is determined to be received in S181, the operation executing section 28e executes the operation corresponding to the request through the communication section 26 (S182) and executes the operation in S181.

Namely, when the background login, that is, the login through the communication section 26, is successful, the operation executing section 28e executes the operation corresponding to the request through the communication section 26, but does not execute the operation corresponding to the request through the operating section 21.

As illustrated in FIG. 6, when the execution of a specific job is requested through the communication section 26 after the process in S154, the MFP 20 executes the processes in S161 to S166, which are the same processes in S111 to S116 illustrated in FIG. 3. Accordingly, the operation executing section 28e notifies through the communication section 26, for example, the execution result notified in S166 from the Java platform 27a to the electronic device which has requested through the communication section 26 to execute the specific job.

As indicated in S162 and S163, the Java platform 27a discloses, to the Java application 27b, the interface in which the authentication/authorization section 28a as one of the functions of the MFP 20 is to be used in the background. Also, as indicated in S164 and S165, the Java platform 27a discloses, to the Java application 27b, the interface in which the job management section 28b as one of the functions of the MFP 20 is to be used in the background.

Although the execution of the job is illustrated in FIG. 6, the same applies to other job operations besides the execution, such as the job cancellation.

Also, although FIG. 6 illustrates the case where one job is executed per one successful login, the job may be executed a plurality of times per one successful login.

The operation of the MFP 20 in performing the background login and the execution of the setting will now be explained.

FIG. 8 is a sequence diagram of the operation of the MFP in performing the background login and the execution of the setting.

As illustrated in FIG. 8, the MFP 20 executes the processes in S151 to S154 which are the same operations illustrated in FIG. 6.

As illustrated in FIG. 8, when the execution of the specific setting of the MFP 20 is requested through the communication section 26 after the process in S154, the operation executing section 28e executes the processes in S171 to S176, which are the same processes in S121 to S126 illustrated in FIG. 5. Accordingly, the operation executing section 28e notifies through the communication section 26, for example, the execution result notified in S176 from the Java platform 27a to the electronic device which has requested through the communication section 26 to execute the specific setting.

As indicated in S172 and S173, the Java platform 27a discloses, to the Java application 27b, the interface in which the authentication/authorization section 28a as one of the functions of the MFP 20 is to be used in the background. As indicated in S174 and S175, the Java platform 27a discloses, to the Java application 27b, the interface in which the device setting section 28c as one of the functions of the MFP 20 is to be used in the background.

Although the execution of the setting is illustrated in FIG. 8, the same applies to other setting operations besides the execution, such as a reference to the setting.

Also, although FIG. 8 illustrates the case where one setting is executed per one successful login, the setting may be executed a plurality of times per one successful login.

Additionally, although FIG. 6 illustrates the execution of the job as a result of the success of the login and FIG. 8 illustrates the execution of the setting as a result of the success of the login, the job and the setting may be both executed per one successful login.

Each of FIG. 6 to FIG. 8 illustrates the operations in a case where the authentication setting of the MFP 20 is valid. When the authentication setting of the M FP 20 is invalid, the MFP 20 may execute the operation corresponding to the request through the communication section 26 even if the login is unexecuted.

As thus far described, when the login through the communication section 26 is successful, the MFP 20 executes the operation corresponding to the request only through the communication section 26 out of the request through the operating section 21 and the communication section 26 (S181 and S182). Accordingly, when the login from a user is necessary to execute the operation corresponding to the request through the communication section 26, the MFP 20 may execute the operation corresponding to the request through the communication section 26 even if the login through the operating section 21 is unexecuted.

For example, a typical image forming apparatus has a problem in that when a login from a user is necessary to execute a printing corresponding to a request received through a communication device, a login through an operating device must be done. However, such problem does not occur in each of the embodiments described in this disclosure.

The MFP 20 does not notify the success of the login to the display section 22 when the login through the communication section 26 is successful. Hence, the MFP 20 may prevent the display section 22 from being automatically switched when a user besides the one who requested the login through the communication section 26 is watching the display of the display section 22.

When the login in the MFP 20 to which the electronic device, such as the MFP 30 or the computer 40, executed through the communication section 26 of the MFP 20 is successful, said electronic device requests the execution of the operation through the communication section 26. Hence, the image forming system 10 may execute a cooperative operation by a plurality of electronic devices. For example, the MFP 30 may synchronize a setting of the MFP 30, such as an address book, to the MFP 20.

The image forming system 10 may be configured so that the electronic device, such as the MFP 30 or the computer 40, requests the MFP 20 through the communication section 26 of the MFP 20 to execute the operation. The image forming system 10 may also be configured so that the MFP 20 also requests the electronic device, such as the MFP 30 or the computer 40, through the communication section of said electronic device to execute the operation. For example, the Java application 27b of the MFP 20 and the Java application of the electronic device, such as the MFP 30 or the computer 40, can automatically exchange information and control each other with the MFP 30 and the computer 40 without human interference. The image forming system 10, therefore, is suitable to the IoT (Internet of Things) environment where things are to be connected to the Internet and a variety of controls are to be operated at each devices.

Although the electronic device of the present disclosure is an MFP in this embodiment, the electronic device may be any image forming apparatuses other than the MFP, such as an exclusive printer, an exclusive scanner, an exclusive copier, and an exclusive facsimile machine. The electronic device may also be any electronic devices other than image forming apparatuses, such as a PC.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An electronic device comprising:
an operating device into which an operation instruction is inputted;
a display device capable of displaying various types of information;
a communication device communicating;
a storage device including a JAVA platform and a JAVA application as an operation control program that operates on the JAVA platform; and
a control section including a central processing unit (CPU), a read only memory (ROM), and a random access memory (RAM),
wherein the control section (i) executes a specified program in the storage device or the ROM to function as an authentication/authorization section, and (ii) executes the JAVA application in the storage device to function as a login control section controlling a login, and an operation executing section executing an operation corresponding to a request when the login controlled by the login control section is successful,
wherein the login control section is capable of receiving two types of login methods including (i) a panel login through the operating device and (ii) a background login through the communication device,
wherein:
the login control section, when receiving the login, requests the login to the JAVA platform, with (i) a login method, (ii) an authentication method for the login, and (iii) authentication information inputted through the operating device;
the JAVA platform, when the login is requested from the login control section, requests the login to the authentication/authorization section, with (i) the login method, (ii) the authentication method for the login, and (iii) the authentication information, all of which are notified from the login control section;
the authentication/authorization section executes an authentication with the authentication method for the login and the authentication information notified from the JAVA platform;
the authentication/authorization section, if the login is successful, notifies a success of the login to the JAVA platform, with the login method and the authentication information notified from the JAVA platform;
the JAVA platform, when the success of the login is notified from the authentication/authorization information, notifies the success of the login to the login control section, with the login method and the authentication information notified from the authentication/authorization section;
the login control section, when the success of the login is notified from the JAVA platform and the login method notified from the JAVA platform is the panel login through the operating device, notifies the success of the login to the display device; and
the login control section, when the success of the login is notified from the JAVA platform and the login method notified from the JAVA platform is the background login through the communication device, does not notify the success of the login to the display device; and
wherein the operation executing section:
executes only an operation corresponding to a request received through the operating device when the panel login through the operating device is successful; and
executes only an operation corresponding to a request received through the communication device when the background login through the communication device is successful.

2. The electronic device according to claim 1, wherein when the background login through the communication device is successful, the login control section further notifies an operation execution result corresponding to the request through the communication device, to the electronic device having sent the request through the communication device.

3. An electronic device system comprising:
a first electronic device serving as the electronic device according to claim 1; and
a second electronic device,
wherein the second electronic device executes a login to the first electronic device through the communication device, and requests an execution of an operation to the first electronic device through the communication device.

4. The electronic device according to claim 1, wherein the authentication method of the login includes (i) a local authentication which the authentication information exists in the storage device of the electric device, (ii) a network authentication which the authentication information exists in an electric device on a network, and (iii) an extensible authentication which the authentication information exists at the JAVA application.

* * * * *